Figure 1:
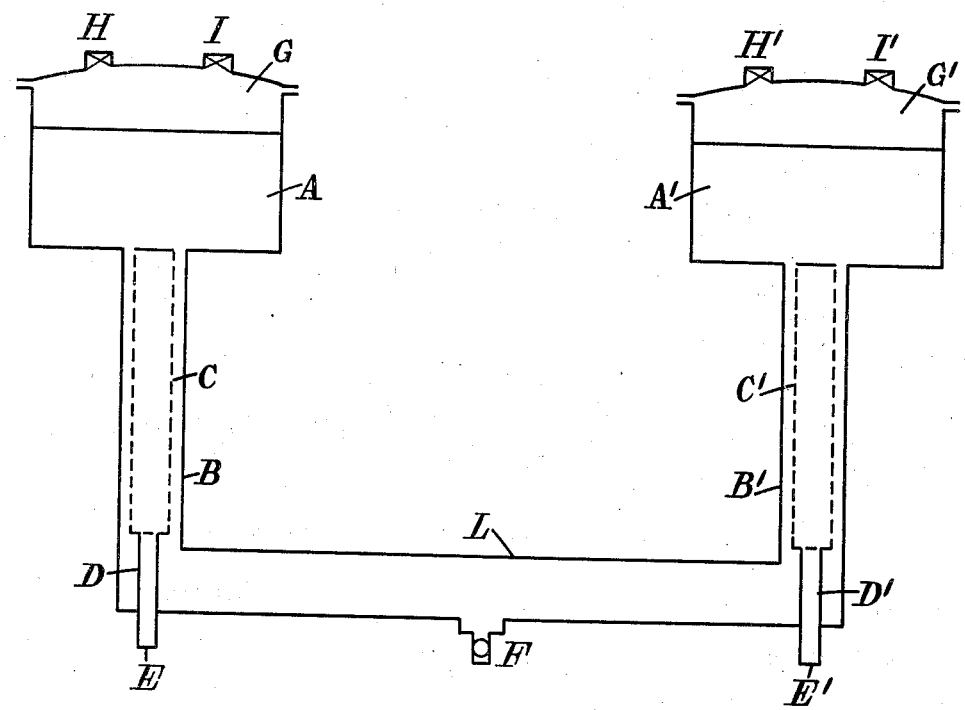

Sept. 12, 1933.  U. PESTALOZZA  1,926,701
MEANS FOR CONCENTRATING AQUEOUS DISPERSIONS OF RUBBER AND THE LIKE
Filed Oct. 20, 1930   2 Sheets-Sheet 1

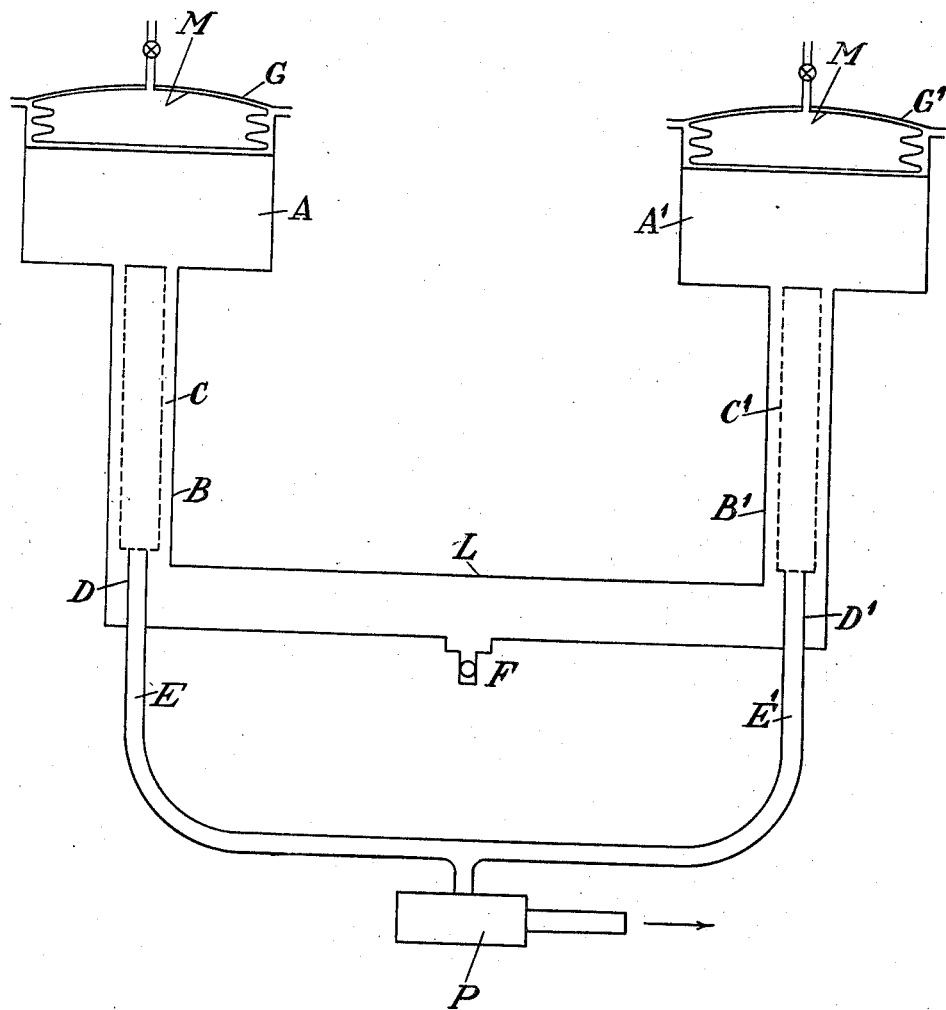

Patented Sept. 12, 1933

1,926,701

UNITED STATES PATENT OFFICE 1,926,701

MEANS FOR CONCENTRATING AQUEOUS DISPERSIONS OF RUBBER AND THE LIKE

Ugo Pestalozza, Milan, Italy, assignor to Societa Italiana Pirelli, Milan, Italy Application October 20, 1930, Serial No. 489,964, and in Great Britain November 8, 1929

5 Claims. (Cl. 210—182)

This invention consists in an improved means for concentrating aqueous dispersions of rubber and the like.

Natural rubber latex as it comes from the plantations usually contains from 30–36 per cent of dry rubber in suspension, the remainder of the material consisting of water containing in solution small quantities of mineral salts, proteins and other natural organic substances, and substances which may have been added to the latex to prevent coagulation, for example, alkaline reagents, usually ammonia.

Many methods have been proposed for concentrating latex, by direct evaporation of the water; by the addition of substances which cause the latex to cream and then separating the concentrated upper layer; and by mechanical means, for example, centrifugal action.

It has further been proposed to concentrate latex by filtering off the serum through membranes or fabrics or ultra-filters, and in particular through filters of unglazed earthenware in an attempt to turn to account the absorptive properties of such material. Thus, if a hollow form of porous earthenware be immersed in latex, the surface of the form becomes covered after a time with a layer of concentrated and thick latex, the rubber particles of which on contact with water at once return into normal suspension. This process, however, has not proved of practical application within my experience, by reason of the fact that the layer of deposited concentrated latex tends to pass into the condition of an irreversible coagulum on subjection to any mechanical treatment, even when light.

In order to facilitate filtration it has also been proposed to stir the fluid while filtering by a stirrer set at such an appropriate distance from the filtering surface as to limit the thickness thereon of the accumulating deposit to a degree which does not unduly impede the passage of the fluid.

According to the present invention an apparatus for dewatering aqueous colloidal dispersions of rubber or the like, for example, rubber latex, comprises in combination a filter surface for separating colloidal matter from its dispersion medium, and means for repeatedly forcing a stream of the dispersion to be dewatered, preferably in the form of a thin film, across said filter surface at such a speed relatively thereto as to prevent clogging of the surface by accumulation thereon of disperse phase from the dispersion.

The invention further includes an apparatus for dewatering to a predetermined degree a body of aqueous colloidal dispersion of rubber or the like, which comprises, in combination, a filter surface, e. g. of porous earthenware, for separating colloidal matter from its dispersion medium, and means for alternately forcing said body in a stream and preferably in the form of a thin film across said filter surface at such a velocity relatively thereto as continuously to deterge the surface of disperse phase tending to accumulate thereon from the dispersion, the repeated passage of the dispersion across the filter surface being continued until the desired degree of dewatering has been attained.

Further, according to the invention, an apparatus for concentrating aqeuous dispersions of rubber and the like comprises means for moving a porous filter (for example, a filter composed of unglazed earthenware) and an aqueous dispersion of the kind described (for example, rubber latex) relatively to one another in such a manner that the pores of the filter are continuously maintained substantially free for the passage of the aqueous filtrate, and means for permitting the aqueous filtrate to discharge from the surface of said filter.

The invention will now be further described with reference to the accompanying drawing, in which—

Figure 1 is a diagrammatic illustration of one method of carrying the invention into effect, and Figure 2 shows a similar method with certain modifications.

Referring to the drawing, A, A' represent two tanks arranged in communication with one another by means of a conduit, of U shape, comprising two vertically disposed linbs B, B', joined by a horizontally arranged pipe L. The horizontal pipe L is provided with a discharge valve F. Arranged within each vertically disposed linb B, B' is a cylindrical filter C, C' composed of unglazed earthenware. The filters C, C' are constructed of such a diameter that the annular space between the outer surfaces of each filter and the inner surface of the corresponding vertically disposed limb B, B' is of approximately 3–4 millimetres.

The filters C, C' are connected at their lower ends to discharge openings E, E' by means of outlet pipes D, D'. These discharge openings E, E', as shown in Figure 2 may, if desired, be connected up to a suction pump P of any suitable type, in order to accentuate as necessary the action of the filters C, C'.

Each of the reservoirs A, A' is provided with an airtight cover G, G', which carry valves H, I and H' and I'. Each of the valves I, H' is arranged in communication with a source of air supply under pressure, whilst each of the valves H, I' is arranged to be placed in communication with the atmosphere. The valves H, I and H', I' are arranged to be actuated by mechanism operable to open alternately the valves I, I' and the valves H, H'.

The operation of the apparatus is as follows:—
The reservoirs A, A' are filled with, for example, rubber-latex of normal rubber content until the level of the liquid reaches approximately the level indicated in the drawing. The airtight covers are then placed in position upon the tanks and the valve mechanism set in operation. If, for example, valves H, H' are closed, and the valves I, I' are open, air enters the tank A by means of the valve I and forces the latex into the tank A', the air in the tank A' escaping through the valve I'. After a predetermined period, the valves I and I' are closed and the valves H, H' opened, whereupon the latex is moved in the reverse direction.

By this method the latex is moved periodically over the surfaces of the filtering devices C, C' in reverse directions. By regulating the pressure of air, the latex may be moved at the required speed over the surfaces of the devices C, C' so as to ensure that the surfaces are maintained substantially free of deposited rubber particles.

It is preferable to arrange the valve mechanism so that any one tank is not completely emptied before the liquid is moved in the reverse direction.

The periodic movement of the latex in opposite directions continues until the desired concentration is obtained, the serum which constitutes the filtrate passing during this operation through the outlet pipes D, D' to the discharge openings, E, E'.

By means of the method and apparatus hereinbefore set forth, it is possible conveniently to obtain latex in a high degree of concentration by filtration, in virtue of the fact that the movement of the liquid and the periodic change of direction of the dispersion has a scouring action which removes particles of rubber which have a tendency to accumulate upon the surface of the filter and so to clog the pores.

The filtration may be increased by augmenting the difference of pressure on the two sides of a filter, for example, by placing the openings E, E' under the influence of a suction device.

It may be found in the operation of the apparatus described that after the latex, for example, has reached a certain degree of concentration, there is a tendency to form a rubber layer on the upper parts of the walls of the tanks due to the preservative, if volatile, being carried away as vapour with the air supply. This defect may be avoided by placing in the tanks air bags shown in dotted line M in Figure 2 of the drawing, which are expanded and collapsed alternately. By this means the air which effects the movement of the latex is kept out of contact therewith.

It will be appreciated that the shape of the filtering surfaces and the disposition of the same may be varied, for example, the surfaces may be flat and the dispersion may be caused to flow over said surfaces by any desired means which will ensure that the speed of the liquid is sufficient to prevent any substantial deposition of the disperse phase upon the filtering surfaces and consequent clogging of the pores of the filter.

The method and apparatus hereinbefore described are capable of producing latex containing 65–70 per cent of dry rubber at normal temperature, and if the temperature be raised, the speed of filtration may be still further increased. Internal or external heating may be employed as desired.

The invention may be applied to dispersions such as those of gutta-percha and balata, and as well as to the concentration of natural rubber latex to aqueous dispersions of artificial and of vulcanized rubber. There may be added to such dispersions, fillers, vulcanizing agents, dyes, protective colloids, preservatives, and other addenda usual in the manufacture of rubber and the like in order to obtain dispersions of high rubber content containing desired proportions of the above ingredients. In concentration according to this invention tendency to coagulation is much reduced. It has been found as a rule that if there be initially added to the dispersion just sufficient of anti-coagulant to confer stability at the final concentration sought, further addition of anti-coagulant—generally undesirable—is not necessary at any subsequent stage of the process.

It will be appreciated that although in the specific embodiment of the invention described the dispersion is moved relatively to the filtering medium, the filtering medium may be moved relatively to the dispersion, or both the dispersion and the filtering medium may be moved, without departing from the spirit of the invention.

What I claim is:—

1. An apparatus for dewatering to a predetermined degree a body of aqueous colloidal dispersion of rubber or the like, for example, rubber latex, which comprises, in combination, two tanks, a U-shaped conduit depending from these tanks and placing them into communication with one another, one limb of the U being connected at the top to one of the tanks and the other to the other tank, a tubular filter for separating colloidal matter from its dispersion medium in each limb of the conduit, these filters being spaced a few millimetres only from the wall of the conduit limb, filtrate discharge pipes leading from the interior of the tubular filters and means alternately to pump the body of dispersion to be dewatered back and forth from tank to tank through the U-shaped conduit at such a speed of the stream of dispersion relatively to the surface of the filter as continuously to deterge said surface of disperse phase tending to accumulate upon it from the dispersion.

2. An apparatus for dewatering to a predetermined degree a body of aqueous colloidal dispersion of rubber or the like, for example, rubber latex, as specified in claim 1, wherein the means for pumping the body of dispersion back and forth from tank to tank comprises means for admitting compressed air to the tanks alternately, sufficient to force the body of dispersion from tank to tank, in combination with valve means in each tank for placing the interior of the tank, above the level of dispersion therein, into communication with the atmosphere as dispersion is being pumped into the tank from the other tank.

3. An apparatus for dewatering to a predetermined degree a body of aqueous colloidal dispersion of rubber or the like, for example, rubber latex, which comprises, in combination, two tanks, a U-shaped conduit depending from these tanks and placing them into communication with one another, one limb of the U being connected at the top to one of the tanks and the other to the other tank, a tubular filter of unglazed earthenware in each limb of the conduit, these filters being spaced a few millimetres only from the wall of the conduit limb, filtrate discharge pipes leading from the interiors of the tubular filters and means alternately to pump the body of dispersion to be dewatered back and forth from tank to tank through the U-shaped conduit at such a speed of the stream of dispersion relatively to the surface of the filter as continuously to deterge said surface of disperse phase tending to accumulate upon it from the dispersion.

4. An apparatus for dewatering to a predetermined degree a body of aqueous colloidal dispersion of rubber or the like, as specified in claim 1, and comprising means for applying suction to the filtrate discharge pipes from the filters.

5. An apparatus for dewatering to a predetermined degree a body of aqueous colloidal dispersion of rubber or the like, for example, rubber latex, as specified in claim 1, wherein the means for pumping the body of dispersion back and forth from tank to tank comprises a collapsible gas bag in each tank and means alternately to inflate these bags with gas under pressure, each bag in turn being inflated and then deflated.

UGO PESTALOZZA.